US008208655B2

(12) United States Patent
Kim et al.

(10) Patent No.: US 8,208,655 B2
(45) Date of Patent: Jun. 26, 2012

(54) WIRELESS RESONATING SURFACE SPEAKER AND METHOD OF USING THE SAME

(75) Inventors: David K. J. Kim, Mission Viejo, CA (US); Peter On, San Diego, CA (US)

(73) Assignee: KYOCERA Corporation, Kyoto (JP)

( * ) Notice: Subject to any disclaimer, the term of this patent is extended or adjusted under 35 U.S.C. 154(b) by 1098 days.

(21) Appl. No.: 11/854,986

(22) Filed: Sep. 13, 2007

(65) Prior Publication Data

US 2009/0074200 A1 Mar. 19, 2009

(51) Int. Cl.
*H04B 1/00* (2006.01)

(52) U.S. Cl. ......... 381/86; 381/71.4; 381/152; 381/334; 381/389

(58) Field of Classification Search .................... 381/86, 381/77, 79, 71.4, 334, 389, 94.7, 71.1, 94.1, 381/431
See application file for complete search history.

(56) References Cited

U.S. PATENT DOCUMENTS 5,687,244 A 11/1997 Untersander
5,784,478 A 7/1998 Untersander
6,456,721 B1 9/2002 Fukuda
6,463,157 B1 10/2002 May
6,668,065 B2 12/2003 Lee et al.
6,718,044 B1 * 4/2004 Alleyne ........................ 381/336
6,728,374 B1 4/2004 Takeda
6,839,443 B2 1/2005 Fukuda
6,914,996 B2 7/2005 Takeda
6,950,682 B2 9/2005 Takeda
6,957,049 B1 10/2005 Takeda
6,999,732 B2 2/2006 Fukuda
7,076,077 B2 7/2006 Atsumi et al.
2005/0147273 A1 7/2005 Azima et al.
2006/0159293 A1 * 7/2006 Azima et al. .................. 381/152

FOREIGN PATENT DOCUMENTS

WO WO 03/005764 A 1/2003
WO WO 03005764 A2 * 1/2003

OTHER PUBLICATIONS

NEC/TOKIN, "Bone Conductive Speaker", (retrieved Feb. 21, 2007) http://www.enc-tokin.com/english/product/piezodevaice1/bone__speaker.html.
NXT, "Technologies" (retrieved Apr. 19, 2007) http://www.nxtsound.com/index.php?is=technologies4/19/2007 6:30:32 AM.
Tactile Sound, "Tactile Sound 101, Clark Synthesis Sound tm, Technical Manual 2002" (retrieved Apr. 19, 2007) http://clarksynthesis.com/whatis.php (lof 8) Apr. 19, 2007 6:33:20 AM.

* cited by examiner

*Primary Examiner* — Vivian Chin
*Assistant Examiner* — Friedrich W Fahnert

(57) ABSTRACT

A wireless speaker and mounting system for use with a resonating surface of an automobile includes a wireless speaker mechanism including a vibrator, the wireless speaker mechanism configured to receive and convert a wireless signal representative of sound from a separate wireless electronic device into vibrations transmitted by vibrator to the resonating surface of the automobile for creating sound waves by the resonating surface; and a mounting mechanism configured to directly mount the wireless speaker mechanism to the resonating surface of the automobile.

17 Claims, 4 Drawing Sheets

WIRELESS RESONATING SURFACE SPEAKER AND METHOD OF USING THE SAME

FIELD OF THE INVENTION

The present invention generally relates to wireless speaker systems, and particularly wireless speaker systems for automobiles.

BACKGROUND

Wireless headsets (e.g., Bluetooth® headsets) that wirelessly communicate with a mobile phone handset for wirelessly communicating with another are known. These wireless handsets are advantageous in that a wired connection is not required between the headset and the mobile phone handset, and they allow a user to operate and communicate with the mobile phone handset without having to hold onto and/or view the handset while driving. A disadvantage of the wireless headsets is that they are worn on the user's ear, which can be uncomfortable, especially over long periods of time. Also, wireless headsets are not designed for use with both ears, inhibiting optimal sound quality.

Some automobiles include factory-installed or after market hands-free calling systems (e.g., On Star®). These hands-free calling systems include a microphone installed (e.g., in the ceiling of the automobile) adjacent the user's head, and utilize the automobile's stereo system and speakers for emitting sound. The main problems with these hands-free calling systems is that they are expensive and have to installed either at the factory during manufacture of the automobile or by a professional installation company if it is an after-market hands-free calling system.

SUMMARY

The above problems with wireless headsets and hands-free calling systems and other problems are addressed by the wireless resonating surface speaker system of the present invention. The wireless resonating surface speaker system includes a speaker mechanism and a mounting mechanism that detachably mounts the system to a resonating surface such as, but not limited to, the windshield of an automobile.

Sound from a separate device (e.g., incoming voice from another caller) in the vicinity of the system is received by the wireless electronic device (e.g., mobile phone handset) in the form of wireless signals. The wireless signals are converted by the wireless electronic device to electrical signals, the electrical signals are processed by the wireless electronic device, and then converted to wireless signals for wireless transmission to the speaker mechanism. The speaker mechanism converts the wireless signals into electrical signals. The electrical signals are processed and electrical signals are transmitted to one or more vibrators, where the electrical signals are converted into acoustic vibrations. The acoustic vibrations are transmitted to the resonating surface (e.g., windshield, dashboard, glove box, mirror, car panel(s), sunroof, internal or external surface, etc.), which serves as a large diaphragm for emitting sound waves. Thus, the speaker mechanism converts the windshield into a large resonating diaphragm for emitting sound waves, which the user hears. The large surface of the windshield and the location of the windshield in front of the driver and passenger(s) makes the windshield an ideal resonating diaphragm for emitting sound waves.

In another aspect of the invention, the speaker mechanism includes one or more acoustic sensors. In this aspect, sound waves (e.g., from the user talking) cause the resonating surface (e.g., windshield) to vibrate. These vibrations are converted by the acoustic sensors into signals that are wirelessly communicated from the speaker mechanism to the mobile phone handset. The mobile phone handset then wirelessly transmits these signals to a base station for delivery to another device.

In a further aspect of the invention, the one or more acoustic sensors are replaced with a microphone. In use, sound waves from the user (e.g., when the user talks) are received by the microphone of the speaker mechanism, and the sound waves are converted into electrical signals that are wirelessly transmitted to the mobile phone handset for remote wireless communication with another caller.

The wireless resonating surface speaker system provides optimal sound quality via the large resonating diaphragm formed by the windshield and allows the user to hear and/or speak via the windshield of an automobile. This eliminates the need to wear a wireless headset or purchase an expensive hands-free calling system while allowing a driver to focus on the road ahead without being distracted by mobile phone handset operation.

Another aspect of the invention involves a wireless speaker and mounting system for use with a resonating surface of an automobile. The wireless speaker and mounting system includes a wireless speaker mechanism including a vibrator, the wireless speaker mechanism configured to receive and convert a wireless signal representative of sound from a separate device into vibrations transmitted by the vibrator to the resonating surface of the automobile for creating sound waves by the resonating surface; and a mounting mechanism configured to directly mount the wireless speaker mechanism to the resonating surface of the automobile.

A further aspect of the invention involves a method of using a wireless speaker and mounting system with a resonating surface of an automobile, the wireless speaker and mounting system including a vibrator. The method includes receiving a wireless signal representative of sound from a separate wireless electronic device; processing the wireless signal and transmitting a signal representative of sound to the vibrator; and emitting acoustic vibrations representative of sound with the vibrator for transmission to the resonating surface of the automobile for creating sound waves by the resonating surface.

Other features and advantages of the present invention will become more readily apparent to those of ordinary skill in the art after reviewing the following detailed description and accompanying drawings.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

Figure 1:
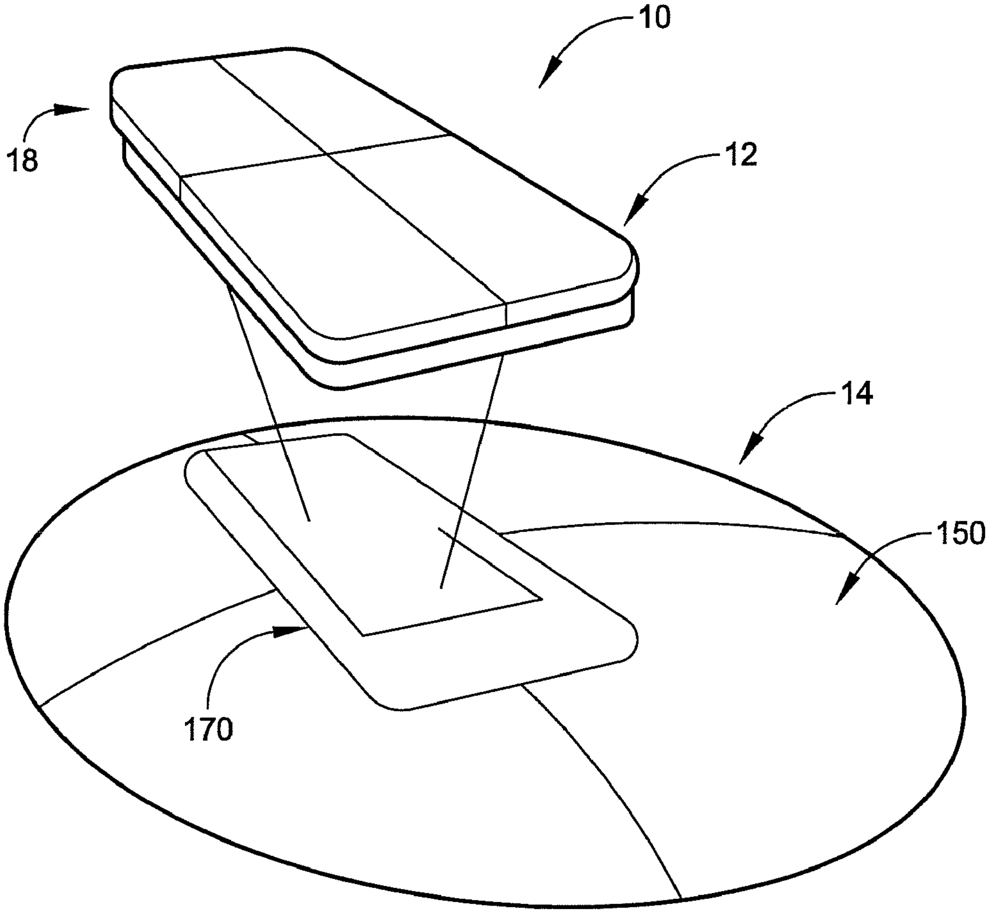
FIG. 1 is a perspective view of an embodiment of a wireless resonating surface speaker and mounting system.

With reference to FIGS. 1-4, embodiments of wireless resonating surface speaker and mounting system ("wireless speaker and mounting system" or "system") 10 will be described. Wireless speaker and mounting system 10 includes wireless speaker mechanism 12 and mounting mechanism 14 for mounting wireless speaker and mounting system 10 to windshield 16.

Although wireless speaker and mounting system 10 has been described in conjunction with a mobile phone handset in a "hands free" calling application, in alternative embodiments, other wireless devices such as, but not limited to, gaming devices, PDAs, laptops, or other portable electronic wireless devices, communicate with wireless speaker and mounting system 10 to emit sound in an automobile via the windshield 16. In further embodiments, wireless speaker and mounting system 10 is mounted to resonating surfaces other than windshield 16 (e.g., windshield, dashboard, glove box, mirror, car panel(s), sunroof, internal or external surface, etc.) for converting the resonating surface into a speaker in the automobile. In still further embodiments, wireless speaker and mounting system 10 is mounted to resonating surfaces other than automobile-related resonating surfaces for converting the resonating surface into a speaker (e.g., household, office, educational or other locations for fixed or portable use).

After reading this description it will become apparent to one skilled in the art how to implement the invention in various alternative embodiments and alternative applications. However, although various embodiments of the present invention will be described herein, it is understood that these embodiments are presented by way of example only, and not limitation. As such, this detailed description of various alternative embodiments should not be construed to limit the scope or breadth of the present invention as set forth in the appended claims.

Wireless speaker mechanism 12 includes housing 18 having rectangular top portion 20 and elongated concave bottom portion 22. Concave bottom portion 22 includes bottom contact surface 24. Although not shown, wireless speaker mechanism 12 may include one or more inputs, buttons, switches (e.g., on/off switch) for controlling wireless speaker mechanism 12.

Figure 5:
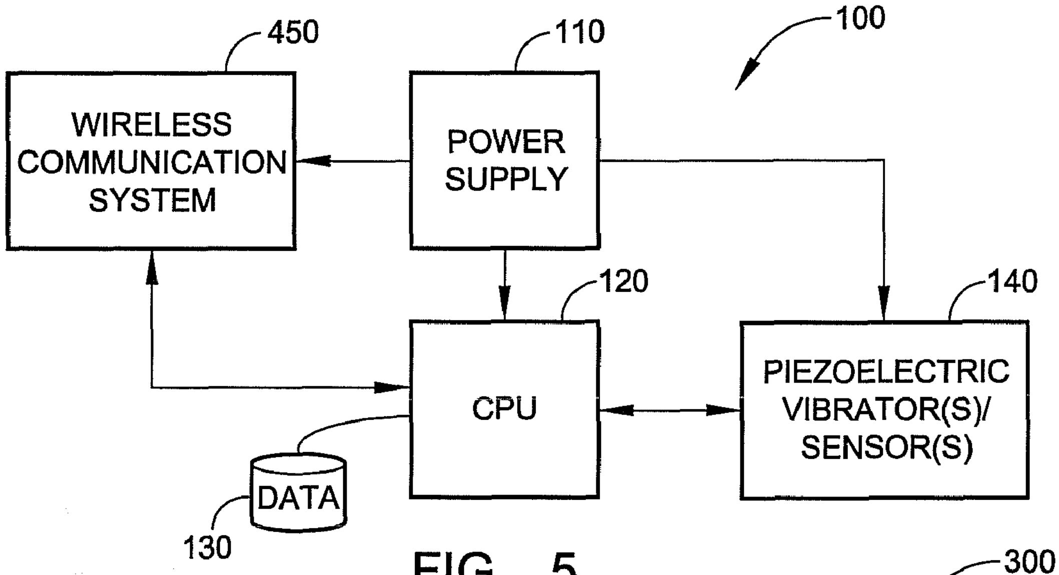
FIG. 5 is a block diagram of the wireless speaker mechanism of the wireless resonating surface speaker and mounting system of FIG. 2.

With reference additionally to FIG. 5, housing 18 of the wireless speaker mechanism 12 houses wireless speaker mechanism electronics 100. An embodiment of wireless speaker mechanism electronics 100 generally includes power supply 110 (e.g., one or more rechargeable batteries), CPU or processor 120, data storage area 130, piezoelectric vibrator(s) 140 (or piezoelectric vibrator(s) and vibration sensor(s)), and wireless communication system 450. In an embodiment of the invention, piezoelectric vibrator(s) 140 are bone conductive speakers that propagate audio signals by vibrating a resonating surface (e.g., windshield 16). Although not shown, in an alternative embodiment, wireless speaker mechanism 12 also includes a microphone (not shown).

Figure 2:
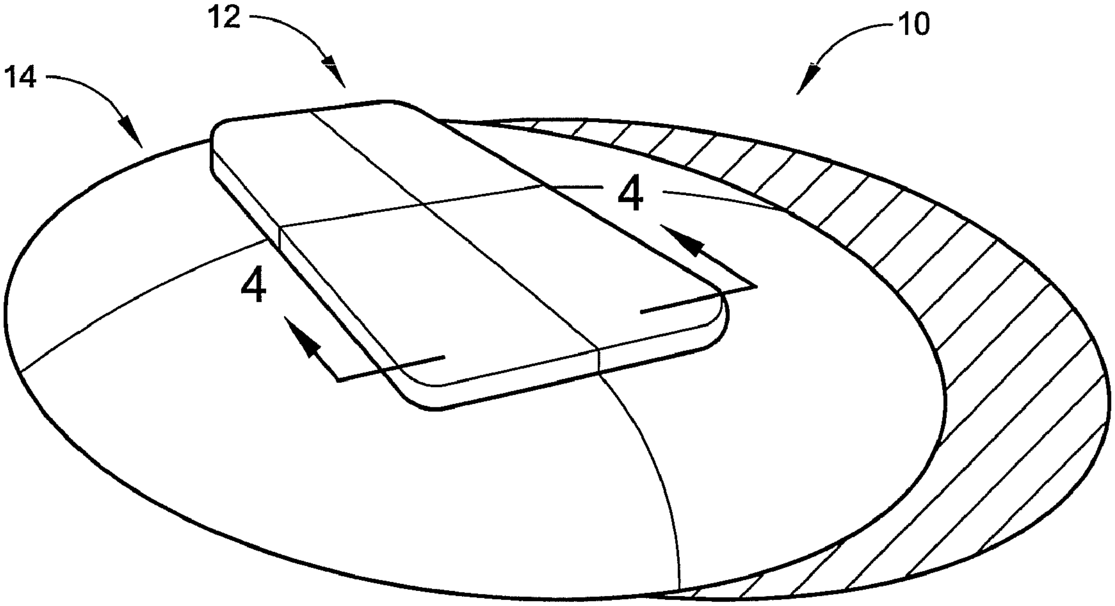
FIG. 2 is a perspective view of another embodiment of a wireless resonating surface speaker and mounting system.
Figure 3:
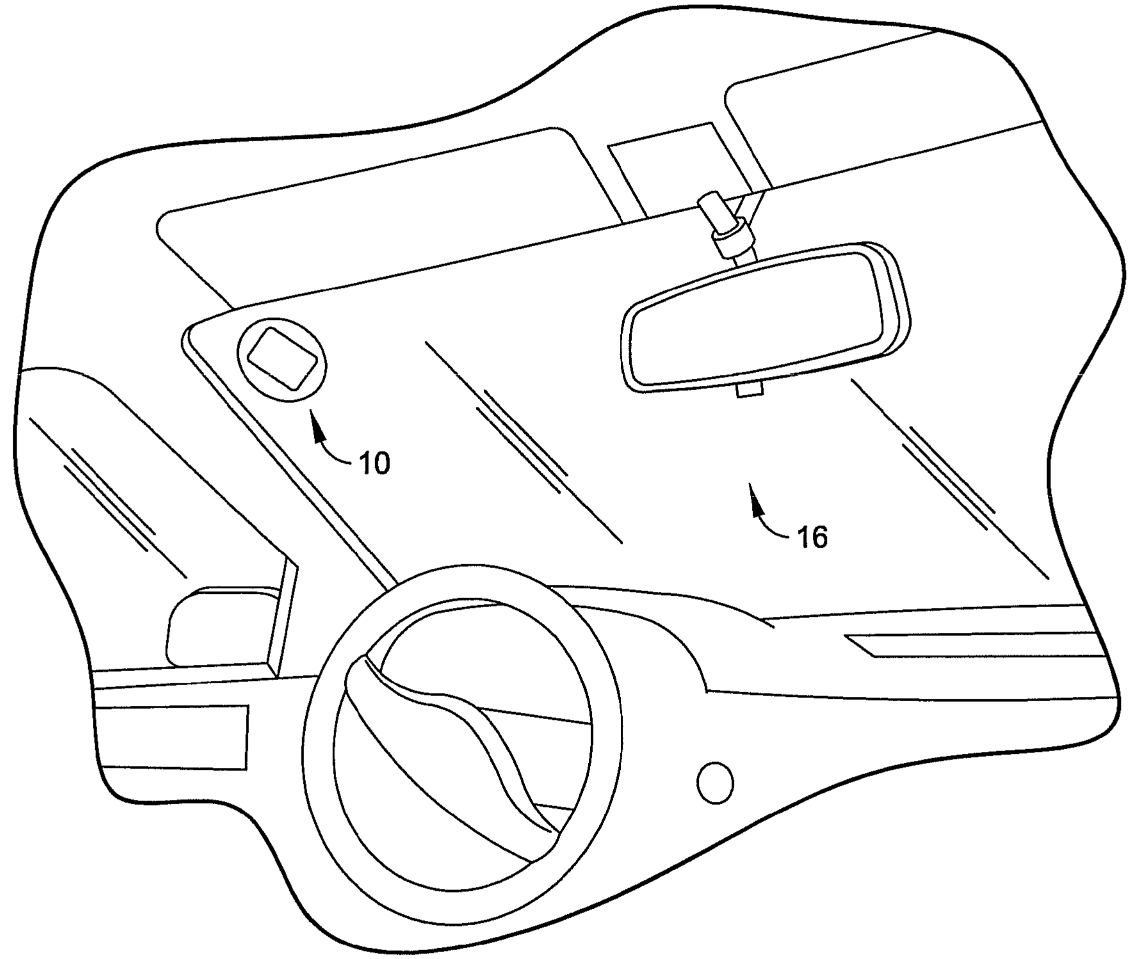
FIG. 3 is a perspective view of an embodiment of the wireless resonating surface speaker of FIG. 2 shown mounted to an inner side of a windshield of an automobile.
Figure 4:
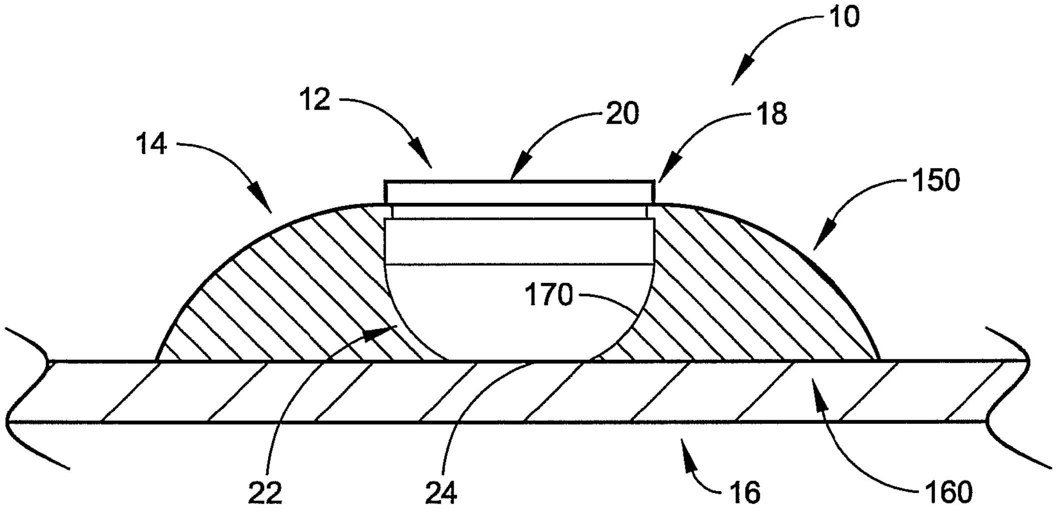
FIG. 4 is a cross-sectional view of the wireless resonating surface speaker and mounting system of FIG. 2 taken along lines 4-4 of FIG. 2.

With reference to FIGS. 1-4, mounting mechanism 14 includes concave upper surface 150 and convex lower surface 160. In an embodiment of the invention, convex lower surface 160 forms a suction cup for mounting wireless speaker and mounting system 10 to windshield 16, allowing it to be portable. Mounting mechanism 14 includes a receiving section 170 that receives wireless speaker mechanism 12. In the embodiment illustrated in FIG. 1, mounting mechanism 14 includes a receiving section 170 for detachably coupling wireless speaker mechanism 12 to mounting mechanism 14. For example, but not by way of limitation, wireless speaker mechanism 12 and receiving section 170 may Include a snap-fit connection for detachably coupling wireless speaker mechanism 12 and mounting mechanism 14 together. FIG. 2 illustrates an embodiment where wireless speaker mechanism 12 and mounting mechanism are integrated into a single unit. As shown in FIG. 4, when wireless speaker mechanism 12 and mounting mechanism 14 are coupled together and wireless speaker and mounting system 10 is mounted to windshield 16, bottom contact surface 24 is in direct contact with windshield 16 for directly transmitting vibrations to/from windshield via piezoelectric vibrator(s)/sensor(s) 140.

Figure 6A:
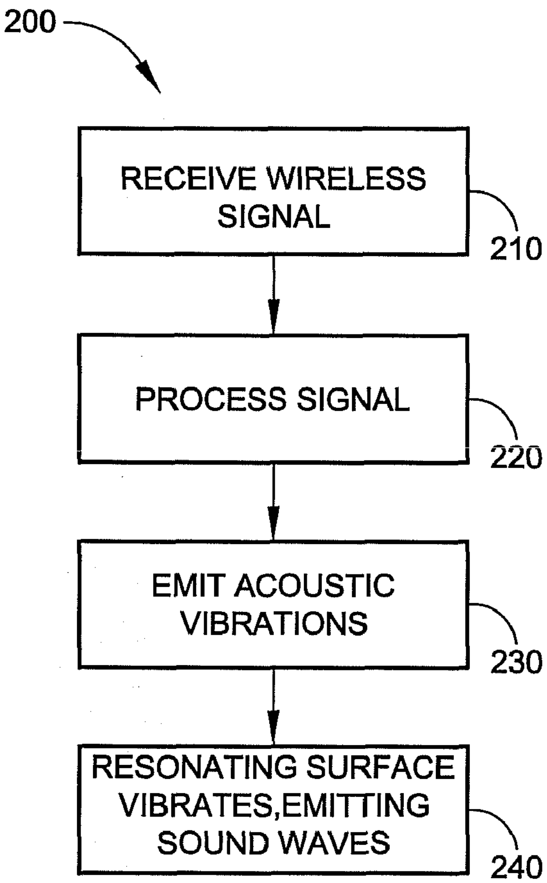
FIG. 6A is an exemplary flow chart of a method of using the wireless speaker mechanism.
Figure 6B:
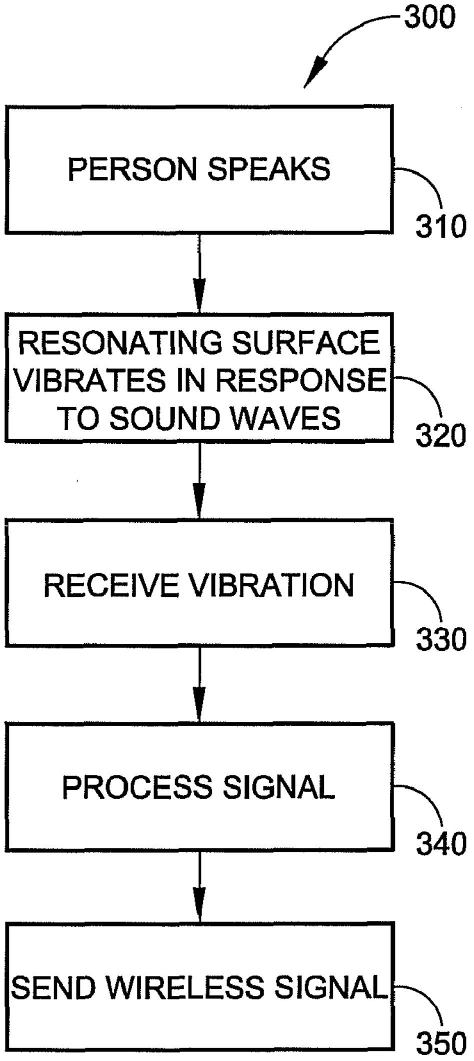
FIG. 6B is an exemplary flow chart of another method of using the wireless speaker mechanism.

With reference to FIGS. 6A and 6B, methods 200, 300 of using the wireless speaker and mounting system 10 will be described.

With reference to FIG. 6A, a method 200 of using wireless speaker and mounting system 10 as a wireless windshield speaker will be described. Signals representative of sound (e.g., sound representative of a remote caller's voice) from a mobile phone handset in the automobile are wirelessly transmitted from mobile phone handset (e.g., through a communication protocol such as, but not limited to, Bluetooth®, Zigbee®) to wireless speaker and mounting system 10. At step 210 these wireless signals are received by wireless speaker and mounting system 10. At step 220, wireless communication system 450 and CPU 120 receive and process the signals. The processed signals indicative of sound are then transmitted to piezoelectric vibrator(s) 140. Piezoelectric vibrator(s) 140 convert the signals into acoustic vibrations and, at step 230, emit the acoustic vibrations. The acoustic vibrations are transmitted from bottom contact surface 24 of wireless speaker mechanism to windshield 16. Windshield 16 forms a large resonating diaphragm that, at step 240, resonates and emits sound waves in response to the high-frequency acoustic vibrations that are heard by the user as sound (e.g., the sound of a remote caller's voice).

With reference to FIG. 6B, a method 300 of using wireless speaker and mounting system 10 as a wireless windshield microphone will be described. At step 310, a first caller/user in the automobile speaks. At step 320, sound waves (e.g., from the first user speaking) cause windshield 16 to vibrate. At step 330, acoustic sensor(s) 140 receive the vibrations from windshield 16. At step 340, these vibrations are processed and converted by acoustic sensor(s) 140 into electrical signals. At step 350, wireless communication system 450 wirelessly transmits signals representative of the first caller's voice to the mobile phone handset in the automobile. The mobile phone handset processes the signals and wirelessly transmits the signals (e.g., via a wireless communication network) for communication with a second caller.

In another embodiment, acoustic sensor(s) 140 are replaced with an electronic microphone so that sound (e.g., sound waves) from the user (e.g., when the user talks/speaks)

is received by the microphone, and converted into electrical signals that are wirelessly transmitted to the mobile phone handset in the automobile. The mobile phone handset processes the signals and wirelessly transmits the signals (e.g., via a wireless communication network) for communication with a second caller.

Wireless speaker and mounting system 10 provides optimal sound quality via the large resonating diaphragm formed by the windshield (or other resonating surface) and allows the user to hear and/or speak via the windshield (or other resonating surface) of an automobile (or other object). This eliminates the need to wear a wireless headset or purchase an expensive hands-free calling system while allowing a driver to focus on the road ahead without being distracted by mobile phone handset operation.

Although wireless speaker and mounting system 10 is described herein as wirelessly communicating with a separate wireless electronic device in the vicinity of the wireless speaker and mounting system 10, in alternative embodiments, wireless speaker and mounting system 10 wirelessly communicates with other wireless electronic devices at long distances. In further embodiments, wireless speaker and mounting system 10 includes more or less features than those described herein. For example, but not by way of limitation, in another embodiment of the invention, wireless speaker and mounting system 10 includes one or more features of (or is integrated with) a gaming device, PDA, laptop, or other portable electronic wireless device. In an embodiment, wireless speaker and mounting system 10 is a remote speaker system with portable resonating surfaces deployed for large gatherings (e.g., rock concert).

Figure 7:
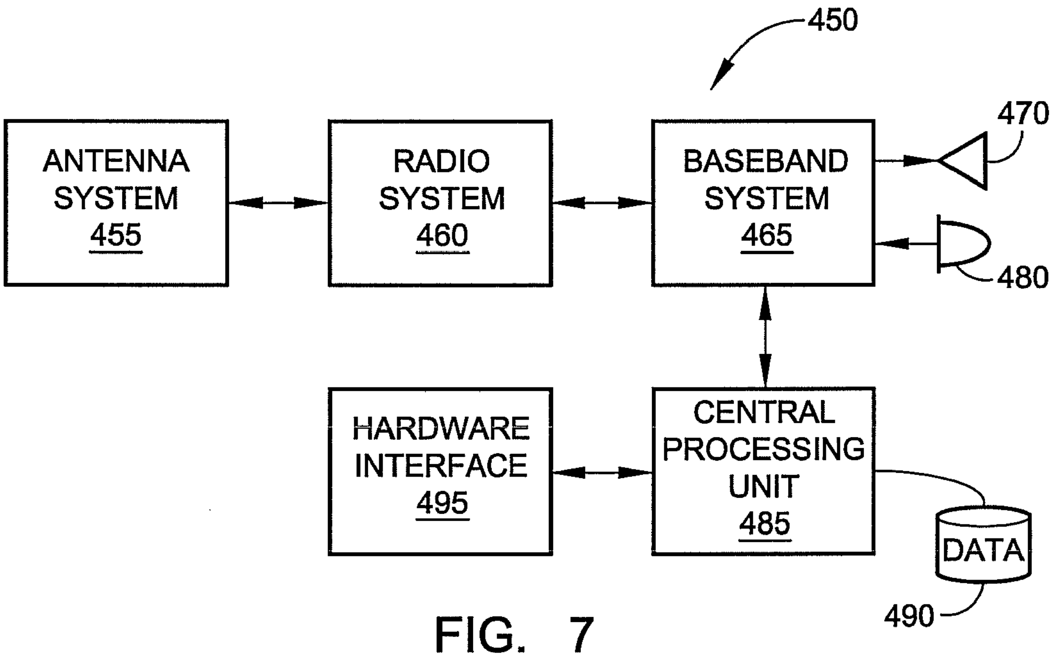
FIG. 7 is a block diagram illustrating an example wireless communication device that may be used in connection with various embodiments described herein.

FIG. 7 is a block diagram illustrating an embodiment of wireless communication system 450 or certain features of the wireless communication system 450. The block diagram and description of wireless communication system 450 is also applicable to the mobile phone handset described above. However, other wireless communication systems and/or architectures may also be used with wireless speaker and mounting system 10, wireless communication system 450 described above with respect to FIG. 5, and/or mobile phone handset, as will be clear to those skilled in the art.

In the illustrated embodiment, wireless communication system 450 comprises an antenna system 455, a radio system 460, a baseband system 465, a speaker 464 (not applicable to wireless speaker and mounting system 10), a microphone 470, a central processing unit ("CPU") 485, a data storage area 490, and a hardware interface 495. In the wireless communication system 450, radio frequency ("RF") signals are transmitted and received over the air by the antenna system 455 under the management of the radio system 460.

In one embodiment, the antenna system 455 may comprise one or more antennae and one or more multiplexors (not shown) that perform a switching function to provide the antenna system 455 with transmit and receive signal paths. In the receive path, received RF signals can be coupled from a multiplexor to a low noise amplifier (not shown) that amplifies the received RF signal and sends the amplified signal to the radio system 460.

In alternative embodiments, the radio system 460 may comprise one or more radios that are configured to communication over various frequencies. In one embodiment, the radio system 460 may combine a demodulator (not shown) and modulator (not shown) in one integrated circuit ("IC"). The demodulator and modulator can also be separate components. In the incoming path, the demodulator strips away the RF carrier signal leaving a baseband receive audio signal, which is sent from the radio system 460 to the baseband system 465.

If the received signal contains audio information, then baseband system 465 decodes the signal and converts it to an analog signal. Then the signal is amplified and sent to the speaker 470. The baseband system 465 also receives analog audio signals from the microphone 480. These analog audio signals are converted to digital signals and encoded by the baseband system 465. The baseband system 465 also codes the digital signals for transmission and generates a baseband transmit audio signal that is routed to the modulator portion of the radio system 460. The modulator mixes the baseband transmit audio signal with an RF carrier signal generating an RF transmit signal that is routed to the antenna system and may pass through a power amplifier (not shown). The power amplifier amplifies the RF transmit signal and routes it to the antenna system 455 where the signal is switched to the antenna port for transmission.

The baseband system 465 is also communicatively coupled with the central processing unit 485. The central processing unit 485 has access to a data storage area 490. The central processing unit 485 is preferably configured to execute instructions (i.e., computer programs or software) that can be stored in the data storage area 490. Computer programs can also be received from the baseband processor 465 and stored in the data storage area 490 or executed upon receipt. Such computer programs, when executed, enable the wireless communication system 450 to perform the various functions of the present invention as previously described. For example, data storage area 490 may include various software modules (not shown) that perform the functions of the wireless speaker and mounting system 10, wireless communication system 450 described above with respect to FIG. 5, and/or mobile phone handset, as described herein.

In this description, the term "computer readable medium" is used to refer to any media used to provide executable instructions (e.g., software and computer programs) to the wireless communication system 450 for execution by the central processing unit 485. Examples of these media include the data storage area 490, microphone 470 (via the baseband system 465), antenna system 455 (also via the baseband system 465), and hardware interface 495. These computer readable mediums are means for providing executable code, programming instructions, and software to the wireless communication system 450. The executable code, programming instructions, and software, when executed by the central processing unit 485, preferably cause the central processing unit 485 to perform the inventive features and functions previously described herein.

The central processing unit 485 is also preferably configured to receive notifications from the hardware interface 495 when new devices are detected by the hardware interface. Hardware interface 495 can be a combination electromechanical detector with controlling software that communicates with the CPU 485 and interacts with new devices. The hardware interface 495 may be a firewire port, a USB port, a Bluetooth® or infrared wireless unit, or any of a variety of wired or wireless access mechanisms. Examples of hardware that may be linked with the system 450 include data storage devices, computing devices, headphones, microphones, and the like.

Figure 8:
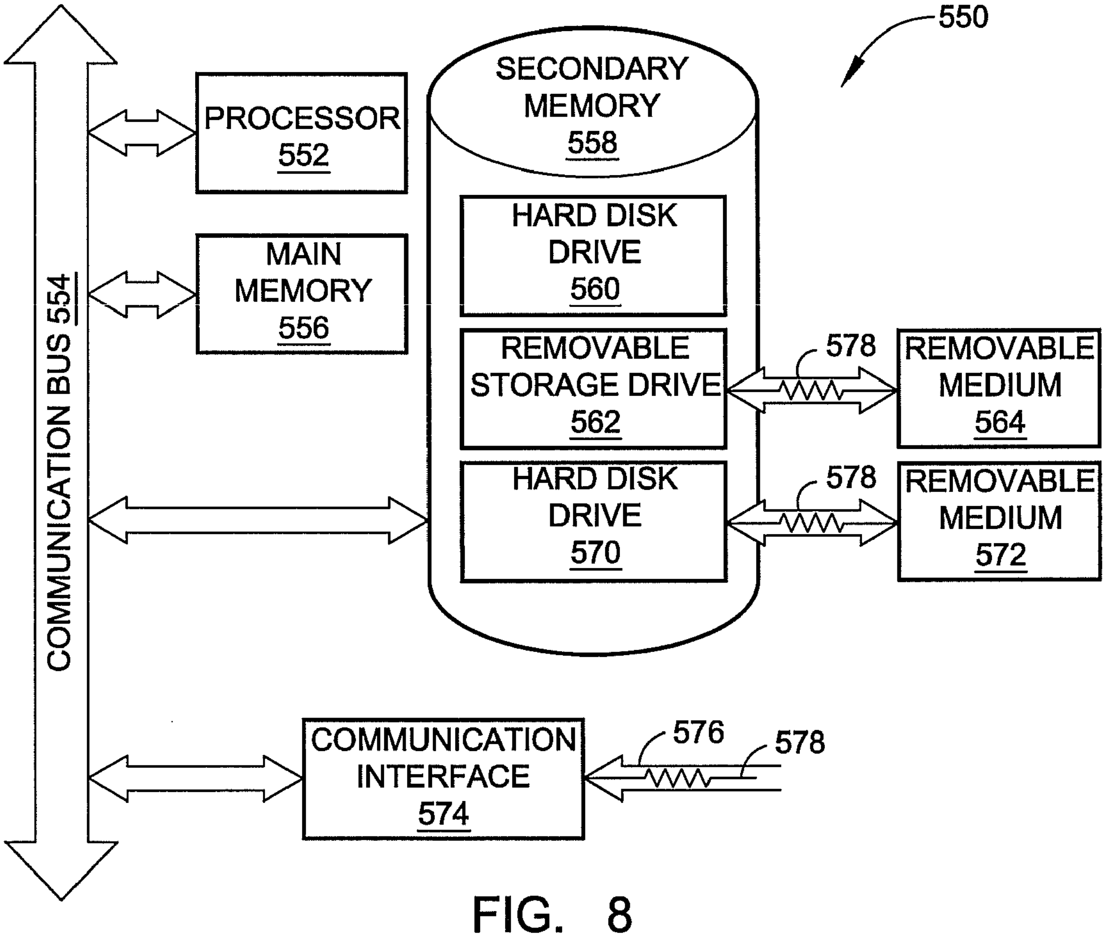
FIG. 8 is a block diagram illustrating an example computer system that may be used in connection with various embodiments described herein.

FIG. 8 is a block diagram illustrating an example computer system 550 that may be used in connection with various embodiments described herein. For example, the computer system 550 may be used in conjunction with wireless speaker and mounting system 10, wireless communication system 450 described above with respect to FIG. 5, and/or mobile phone handset. However, other computer systems and/or architectures may be used, as will be clear to those skilled in the art.

The computer system 550 preferably includes one or more processors, such as processor 552. Additional processors may be provided, such as an auxiliary processor to manage input/output, an auxiliary processor to perform floating point mathematical operations, a special-purpose microprocessor having an architecture suitable for fast execution of signal processing algorithms (e.g., digital signal processor), a slave processor subordinate to the main processing system (e.g., back-end processor), an additional microprocessor or controller for dual or multiple processor systems, or a coprocessor. Such auxiliary processors may be discrete processors or may be integrated with the processor 552.

The processor 552 is preferably connected to a communication bus 554. The communication bus 554 may include a data channel for facilitating information transfer between storage and other peripheral components of the computer system 550. The communication bus 554 further may provide a set of signals used for communication with the processor 552, including a data bus, address bus, and control bus (not shown). The communication bus 554 may comprise any standard or non-standard bus architecture such as, for example, bus architectures compliant with industry standard architecture ("ISA"), extended industry standard architecture ("EISA"), Micro Channel Architecture ("MCA"), peripheral component interconnect ("PCI") local bus, or standards promulgated by the Institute of Electrical and Electronics Engineers ("IEEE") including IEEE 488 general-purpose interface bus ("GPIB"), IEEE 696/S-100, and the like.

Computer system 550 preferably includes a main memory 556 and may also include a secondary memory 558. The main memory 556 provides storage of instructions and data for programs executing on the processor 552. The main memory 556 is typically semiconductor-based memory such as dynamic random access memory ("DRAM") and/or static random access memory ("SRAM"). Other semiconductor-based memory types include, for example, synchronous dynamic random access memory ("SDRAM"), Rambus dynamic random access memory ("RDRAM"), ferroelectric random access memory ("FRAM"), and the like, including read only memory ("ROM").

The secondary memory 558 may optionally include a hard disk drive 560 and/or a removable storage drive 562, for example a floppy disk drive, a magnetic tape drive, a compact disc ("CD") drive, a digital versatile disc ("DVD") drive, etc. The removable storage drive 562 reads from and/or writes to a removable storage medium 564 in a well-known manner. Removable storage medium 564 may be, for example, a floppy disk, magnetic tape, CD, DVD, etc.

The removable storage medium 564 is preferably a computer readable medium having stored thereon computer executable code (i.e., software) and/or data. The computer software or data stored on the removable storage medium 564 is read into the computer system 550 as electrical communication signals 578.

In alternative embodiments, secondary memory 558 may include other similar means for allowing computer programs or other data or instructions to be loaded into the computer system 550. Such means may include, for example, an external storage medium 572 and an interface 570. Examples of external storage medium 572 may include an external hard disk drive or an external optical drive, or and external magneto-optical drive.

Other examples of secondary memory 558 may include semiconductor-based memory such as programmable read-only memory ("PROM"), erasable programmable read-only memory ("EPROM"), electrically erasable read-only memory ("EEPROM"), or flash memory (block oriented memory similar to EEPROM). Also included are any other removable storage units 572 and interfaces 570, which allow software and data to be transferred from the removable storage unit 572 to the computer system 550.

Computer system 550 may also include a communication interface 574. The communication interface 574 allows software and data to be transferred between computer system 550 and external devices (e.g. printers), networks, or information sources. For example, computer software or executable code may be transferred to computer system 550 from a network server via communication interface 574. Examples of communication interface 574 include a modem, a network interface card ("NIC"), a communications port, a PCMCIA slot and card, an infrared interface, and an IEEE 1394 fire-wire, just to name a few.

Communication interface 574 preferably implements industry promulgated protocol standards, such as Ethernet IEEE 802 standards, Fiber Channel, digital subscriber line ("DSL"), asynchronous digital subscriber line ("ADSL"), frame relay, asynchronous transfer mode ("ATM"), integrated digital services network ("ISDN"), personal communications services ("PCS"), transmission control protocol/Internet protocol ("TCP/IP"), serial line Internet protocol/point to point protocol ("SLIP/PPP"), and so on, but may also implement customized or non-standard interface protocols as well.

Software and data transferred via communication interface 574 are generally in the form of electrical communication signals 578. These signals 578 are preferably provided to communication interface 574 via a communication channel 576. Communication channel 576 carries signals 578 and can be implemented using a variety of wired or wireless communication means including wire or cable, fiber optics, conventional phone line, cellular phone link, wireless data communication link, radio frequency (RF) link, or infrared link, just to name a few.

Computer executable code (i.e., computer programs or software) is stored in the main memory 556 and/or the secondary memory 558. Computer programs can also be received via communication interface 574 and stored in the main memory 556 and/or the secondary memory 558. Such computer programs, when executed, enable the computer system 550 to perform the various functions of the present invention as previously described.

In this description, the term "computer readable medium" is used to refer to any media used to provide computer executable code (e.g., software and computer programs) to the computer system 550. Examples of these media include main memory 556, secondary memory 558 (including hard disk drive 560, removable storage medium 564, and external storage medium 572), and any peripheral device communicatively coupled with communication interface 574 (including a network information server or other network device). These computer readable mediums are means for providing executable code, programming instructions, and software to the computer system 550.

In an embodiment that is implemented using software, the software may be stored on a computer readable medium and loaded into computer system 550 by way of removable storage drive 562, interface 570, or communication interface 574. In such an embodiment, the software is loaded into the computer system 550 in the form of electrical communication signals 578. The software, when executed by the processor 552, preferably causes the processor 552 to perform the inventive features and functions previously described herein.

Various embodiments may also be implemented primarily in hardware using, for example, components such as application specific integrated circuits ("ASICs"), or field programmable gate arrays ("FPGAs"). Implementation of a hardware state machine capable of performing the functions described herein will also be apparent to those skilled in the relevant art. Various embodiments may also be implemented using a combination of both hardware and software.

Furthermore, those of skill in the art will appreciate that the various illustrative logical blocks, modules, circuits, and method steps described in connection with the above described figures and the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, circuit or step is for ease of description. Specific functions or steps can be moved from one module, block or circuit to another without departing from the invention.

Moreover, the various illustrative logical blocks, modules, and methods described in connection with the embodiments disclosed herein can be implemented or performed with a general purpose processor, a digital signal processor ("DSP"), an ASIC, FPGA or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. An exemplary storage medium can be coupled to the processor such the processor can read information from, and write information to, the storage medium. In the alternative, the storage medium can be integral to the processor. The processor and the storage medium can also reside in an ASIC.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

What is claimed is:

1. A wireless speaker and mounting system for use with an existing, accessible resonating surface of an automobile, comprising:

a wireless speaker mechanism including a vibrator, the wireless speaker mechanism configured to receive and convert a wireless signal representative of sound from a separate wireless electronic device into vibrations transmitted by vibrator to the resonating surface of the automobile for creating sound waves by the resonating surface, the vibrator including a bottom contact surface; and a releasable mounting mechanism associated with the wireless speaker mechanism and configured for temporary attachment to the resonating surface of the automobile to temporarily mount the bottom contact surface of the vibrator of the wireless speaker mechanism directly against the existing, accessible resonating surface of the automobile, the mounting mechanism having a receiving section in which the vibrator is located, and the receiving section being configured so that the bottom contact surface of the vibrator directly contacts the resonating surface.

2. The wireless speaker and mounting system of claim 1, wherein the vibrator is a piezoelectric vibrator configured to transmit vibrations directly to the resonating surface of the automobile for creating sound waves by the resonating surface.

3. The wireless speaker and mounting system of claim 1, wherein the wireless speaker mechanism includes a wireless communication system configured to communicate wirelessly with the separate wireless electronic device.

4. The wireless speaker and mounting system of claim 1, wherein the resonating surface of the automobile is a windshield of the automobile.

5. The wireless speaker and mounting system of claim 1, wherein the resonating surface of the automobile is at least one of a dashboard and a glove box of the automobile.

6. The wireless speaker and mounting system of claim 1, wherein the wireless speaker mechanism includes a microphone.

7. The wireless speaker and mounting system of claim 1, wherein the wireless speaker and mounting system includes a vibration sensor configured to receive vibrations representative of sound directly from the resonating surface via direct contact between the bottom contact surface of the vibrator and the resonating surface of the automobile and convert the vibrations representative of sound into electrical signals for conversion into wireless signals and transmission to the separate wireless electronic device.

8. The wireless speaker and mounting system of claim 1, wherein the wireless speaker mechanism is detachably connected to mounting mechanism.

9. The wireless speaker and mounting system of claim 1, wherein the wireless speaker mechanism is integrated with mounting mechanism.

10. A method of using a wireless speaker and mounting system with an existing resonating surface of an automobile, the wireless speaker and mounting system including a vibrator with a bottom contact surface, comprising:

temporarily attaching the wireless speaker and mounting system to an existing, accessible resonating surface of an automobile with the bottom contact surface of the vibrator in direct face-to-face contact with the existing, accessible resonating surface of the automobile;

receiving a wireless signal representative of sound from a separate wireless electronic device;

processing the wireless signal and transmitting a signal representative of sound to the vibrator;

emitting acoustic vibrations representative of sound with the vibrator for transmission to the resonating surface of the automobile for creating sound waves by the resonating surface;

directly transmitting acoustic vibrations from the vibrator to the resonating surface via the direct contact between the bottom contact surface of the vibrator and the resonating surface of the automobile.

11. The method of claim 10, wherein the wireless speaker and mounting system includes a wireless speaker mechanism including the vibrator and a mounting mechanism that carries the wireless speaker mechanism and is configured to mount the wireless speaker and mounting system to the resonating surface of the automobile, and further including mounting the wireless speaker and mounting system to the resonating surface of the automobile based on user input and transmitting acoustic vibrations from the vibrator to the resonating surface of the automobile for creating sound waves by the resonating surface.

12. The method of claim 10, wherein the vibrator is a piezoelectric vibrator, and emitting acoustic vibrations representative of sound with the vibrator includes emitting acoustic vibrations representative of sound with the piezoelectric vibrator.

13. The method of claim 10, wherein the wireless speaker and mounting system includes a wireless speaker mechanism having a wireless communication system configured to communicate wirelessly with the separate wireless electronic device, and receiving a wireless signal includes receiving a wireless signal with the wireless communication system of the wireless speaker mechanism.

14. The method of claim 10, wherein the resonating surface of the automobile is a windshield of the automobile, and further including transmitting acoustic vibrations representative of sound from the vibrator to the windshield of the automobile for creating sound waves by windshield of the automobile.

15. The method of claim 10, wherein the resonating surface of the automobile is at least one of a dashboard and a glove box, and further including transmitting acoustic vibrations representative of sound from the vibrator to at least one of a dashboard and a glove box for creating sound waves by at least one of a dashboard and a glove box of the automobile.

16. The method of claim 10, wherein the wireless speaker and mounting system includes a wireless speaker mechanism having a microphone, and further including receiving sound waves representative of a user's voice, converting the sound waves into electrical signals with the microphone, converting the electrical signals into wireless signals, and outputting the wireless signals for transmission to the separate wireless electronic device.

17. The method of claim 10, wherein the wireless speaker and mounting system includes a vibration sensor, and further including receiving vibrations representative of sound directly from the resonating surface with the vibration sensor via direct contact between the bottom contact surface of the vibrator and the resonating surface of the automobile, converting the vibrations representative of sound into electrical signals, converting the electrical signals into wireless signals, and outputting the wireless signals for transmission to the separate wireless electronic device.

* * * * *